(12) United States Patent
Heilmann (10) Patent No.: US 9,195,952 B2
(45) Date of Patent: Nov. 24, 2015

(54) SYSTEMS AND METHODS FOR CONTEXTUAL MAPPING UTILIZED IN BUSINESS PROCESS CONTROLS

(75) Inventor: Craig Erich Heilmann, San Antonio, TX (US)

(73) Assignee: Accenture Global Services Limited, Dublin (IE)

( * ) Notice: Subject to any disclaimer, the term of this patent is extended or adjusted under 35 U.S.C. 154(b) by 891 days.

(21) Appl. No.: 12/732,266

(22) Filed: Mar. 26, 2010

(65) Prior Publication Data

US 2011/0234593 A1 Sep. 29, 2011

(51) Int. Cl.
| | |
|---|---|
| *G06F 17/30* | (2006.01) |
| *G06Q 10/06* | (2012.01) |
| *H04L 12/24* | (2006.01) |
| *H04L 12/26* | (2006.01) |

(52) U.S. Cl.
CPC .............. *G06Q 10/06* (2013.01); *H04L 41/22* (2013.01); *H04L 43/045* (2013.01)

(58) Field of Classification Search
CPC ....... G06Q 10/06; H04L 41/22; H04L 43/045
See application file for complete search history.

(56) References Cited

U.S. PATENT DOCUMENTS

| | | | |
|---|---|---|---|
| 7,213,232 B1 * | 5/2007 | Knowles | 717/121 |
| 2002/0042731 A1 * | 4/2002 | King et al. | 705/10 |
| 2003/0149571 A1 * | 8/2003 | Francesco et al. | 705/1 |
| 2004/0001103 A1 * | 1/2004 | Fliess et al. | 345/810 |
| 2004/0107202 A1 * | 6/2004 | Burdick et al. | 707/101 |
| 2004/0190506 A1 * | 9/2004 | Davis et al. | 370/389 |
| 2005/0055369 A1 * | 3/2005 | Gorelik et al. | 707/102 |
| 2005/0114829 A1 * | 5/2005 | Robin et al. | 717/101 |
| 2005/0251432 A1 * | 11/2005 | Barker et al. | 705/7 |
| 2006/0015381 A1 * | 1/2006 | Flinn et al. | 705/7 |
| 2010/0055662 A1 * | 3/2010 | Betebenner | 434/430 |
| 2010/0079464 A1 * | 4/2010 | Matsumura | 345/440 |
| 2010/0095235 A1 * | 4/2010 | Bennett et al. | 715/781 |
| 2011/0029947 A1 * | 2/2011 | Markovic | 717/102 |

OTHER PUBLICATIONS

Dongen, et al., 2008, Measuring Similarity between Business Process Models, Springer-Verlag Berlin Heidelberg.*

* cited by examiner

*Primary Examiner* — Neveen Abel Jalil
*Assistant Examiner* — Kristofer Biskeborn
(74) *Attorney, Agent, or Firm* — Harrity & Harrity, LLP (57) ABSTRACT

Systems and methods are provided for designing business process controls utilizing a contextual mapping engine. A set of statements relating to business process controls are received and stored in a repository. The contextual mapping engine compares the statements to determine matching scores between statements. Statements with matching scores greater than a predetermined threshold are removed from the repository.

23 Claims, 7 Drawing Sheets

FIG. 1

| Source ID | Source Statement | Matching Score | Matching Category | Matching Statement | Matching ID |
|---|---|---|---|---|---|
| 45 | Unmonitored changes, additions, or deletions of master data elements may result in financial reporting errors | 59% | ABC | The possibility of unauthorized or inadvertent alterations of master data may negatively impact financial reporting requirements | 58 |
| 79 | Asdfl;jweirkjlmcldkht;lrktjalknvlakjdf;laksdf | 56% | DEF | Asdfjlwekuoijclaskdj;laktj;lkjclkmlkjf | 158 |
| ... | ... | ... | ... | ... | ... |

SYSTEMS AND METHODS FOR CONTEXTUAL MAPPING UTILIZED IN BUSINESS PROCESS CONTROLS

TECHNICAL FIELD

This disclosure is directed to systems and methods for contextual mapping, and more particularly, to systems and methods for contextual mapping as utilized in business process controls design and/or implementation.

BACKGROUND

Business process management focuses on aligning aspects of an organization with the needs of the organization and/or its clients. This type of process management typically aims to promote business effectiveness and efficiency, and at the same time, promote innovation and integration with existing or innovative technology. Design of business process controls is one aspect of the business process management. Another aspect is risk management, which is the identification, assessment, and prioritization of risks followed by coordinated and economical application of resources to minimize, monitor, and control the probability and/or impact of unpredictable events.

Business process control design work may be heavily dependent on very long lists of risk statements and control requirements. However, there may be an inevitable and undesirable high degree of duplication and redundancy as the list grows into the hundreds and even thousands of statements. Risk statements and control requirements are typically written in a standard way such that they are fairly consistent blocks of text. For example, a typical risk statement or control requirement may be two to five sentences long. Even a single individual may express concepts differently over the course of time. Thus, the degree of duplication and redundancy may be greatly increased when these risk statements and control requirements are written by a team of diverse individuals, whom may even employ different languages. Thus, these risk statements and control requirements may include redundant statements/requirements (e.g., statements/requirements that may be substantially identical, or may be directed to substantially identical subject matter).

In addition, it may be desirable to establish links or relationships between the lists of risk statements and control requirements. For example, business process control design work may require the mapping of control requirements to a corporation requirements. It may be inefficient for an individual or a team of individuals to manually conduct the mapping of control requirements to the policies and/or procedures. The above-described inefficiencies may exist in other aspects of design and/or implementation of business process controls.

It is desirable to provide systems and methods to address issues of designing and/or implementing business process controls, as set forth above.

SUMMARY

In one embodiment, a method is provided for designing business process controls utilizing a contextual mapping engine. The method may include receiving a plurality of statements relating to one or more business process controls, and storing the statements in a repository. The method may also include utilizing the contextual mapping engine to compare a first statement of the plurality of statements with a second statement of the plurality of statements and to generate a result of the comparison. The method may also include utilizing the contextual mapping engine to generate a matching score between the first statement and the second statement. The method may further include removing the second statement from the repository if the matching score is above a predetermined threshold.

In another embodiment, a system is provided for designing business process controls utilizing a contextual mapping engine. The system may include a memory and a processor coupled to the memory and the contextual mapping engine. The processor may be configured to receive a first set of statements relating to one or more business process controls, and store the first set of statements in a repository. The processor may also be configured to utilize the contextual mapping engine. The contextual mapping engine may compare a first statement of the first set of statements with a second statement of the first set of statements and generate a result of the comparison, and generate a matching score between the first statement and the second statement. the processor may further be configured to remove the second statement of the first set of statements from the repository if the matching score is above a predetermined threshold.

In yet another embodiment, a method is provided for performing risk analysis utilizing a contextual mapping engine. The method may include receiving a first set of statements relating to one or more business process controls, and receiving a second set of statements relating to the one or more business process controls. The method may also include storing the first set of statements in a repository, and storing the second set of statements in the repository. The method may further include utilizing the contextual mapping engine to compare the first set of statements with the second set of statements and generate a result of the comparison, and generate a matching score between a statement in the first set of statements and a statement in the second set of statements based on the result of the comparison. The method may further still include removing the statement in the second set of statements from the repository if the matching score is above a predetermined threshold.

In yet another embodiment, a computer program embodied on a computer-readable medium is provided for designing business process controls utilizing a contextual mapping engine. The computer program may include a code segment for receiving a plurality of statements relating to one or more business process controls. The computer program may also include a code segment for storing the plurality of statements in a repository. The computer program may further include a code segment for utilizing the contextual mapping engine to compare a first statement of the plurality of statements with a second statement of the plurality of statements, generate a result of the comparison, and generate a matching score between the first statement and the second statement. Moreover, the computer program may include a code segment for removing the second statement of the plurality of statements from the repository if the matching score is above a predetermined threshold.

It is to be understood that both the foregoing description and the following description are exemplary and explanatory only and are not restrictive of the invention, as claimed.

The accompanying drawings, which are incorporated in and constitute a part of this specification, illustrate exemplary embodiments of the invention and together with the description, serve to explain the principles of the invention.

DETAILED DESCRIPTION

Reference will now be made in detail to the present exemplary embodiments consistent with the invention, examples of which are illustrated in the accompanying drawings. Wherever convenient, the same reference numbers will be used throughout the drawings to refer to the same or like parts.

Figure 1:
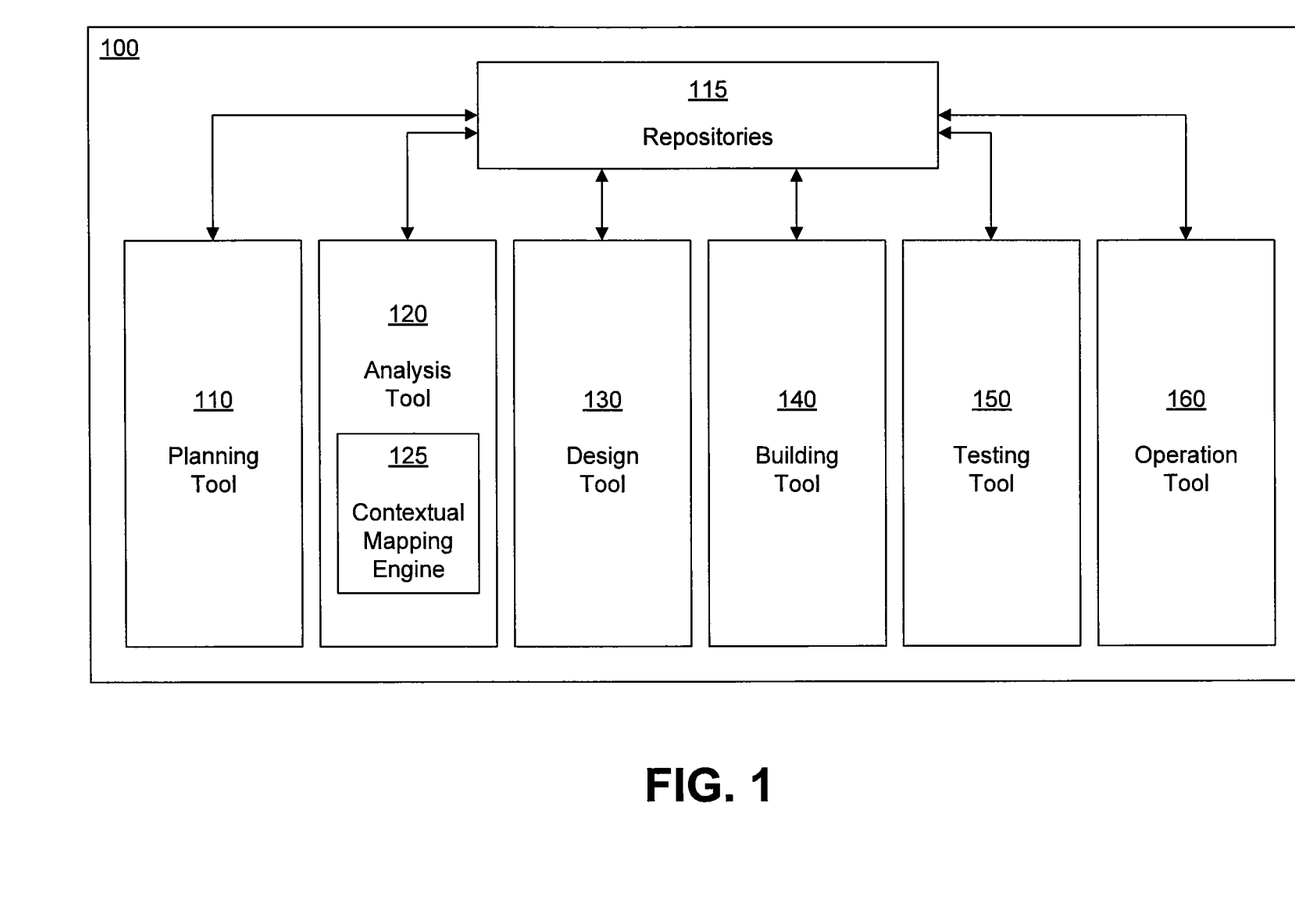
FIG. 1 is a block diagram illustrating an exemplary embodiment of a system for performing business process control design utilizing a contextual mapping engine.

FIG. 1 illustrates an exemplary system 100 that may be utilized in business process controls design and/or implementation. A user may utilize system 100 to conduct various tasks associated with design and/or implementation of business process controls such as (1) a planning phase, (2) an analysis phase, (3) a design phase, (4) a building phase, (5) a testing phase, and (6) an operation phase. According to some embodiments, the planning phase may include assessing existing controls, assessing available resources, and constructing various models for different design scenarios, etc. The analysis phase may include identifying risks, identifying control objectives, conducting policy mapping, and identifying other design requirements, etc.

The design phase may involve identifying design control activities, identifying design objectives, developing design requirements, performing categorization/prioritization of control requirements, etc. The building phase may include providing support to: designers, trainers, and testers, etc. The testing phase may include validating and/or implementing business process controls designed during the building phase, and debugging, etc. The operation phase may include monitoring and tracking of individual process implemented, and providing feedbacks for possible optimization of the business process controls design, etc.

Referring to FIG. 1, system 100 may include a planning tool 110, one or more repositories 115, an analysis tool 120, a design tool 130, a building tool 140, a testing tool 150, and an operation tool 160. It is contemplated that system 100 may include more or less components, if appropriate and/or necessary. In some embodiments, planning tool 110 may assist a user in the planning phase of designing and/or implementing business process controls. In some embodiments, planning tool 110 may receive inputs relating to goals, rules, guidelines, or requirements, and/or any other type of appropriate parameters associated with one or more sets of business process controls to be designed and/or implemented. According to some embodiments, planning tool 110 may be connected to repositories 115. The inputs received by planning tool 110 may be stored in repositories 115. For example, planning tool 110 may receive one or more risk and control libraries containing various risk statements and/or controls (e.g., elements of management such as setting standards, measuring actual performance, and/or taking corrective action). The risk and control libraries may be stored in repositories 115. It is contemplated that inputs may be provided by a third party (e.g., a client of a user using planning tool 110, or industry-standard risk and control libraries) or by a user of planning tool 110.

According to some embodiments, analysis tool 120 may include a contextual mapping engine 125. Analysis tool 120 may assist a user in the analysis phase of designing and/or implementing business process controls, such as during the design of control framework, for example. In some embodiments, analysis tool 120 may be utilized to identify one or more risks associated with the set of business process controls to be designed and/or implemented. In some embodiments, analysis tool 120 may also be utilized to normalize and/or score these one or more risks. For example, planning tool 110 may communicate the one or more risk and control libraries to analysis tool 120. In some embodiments, contextual mapping engine 125 may be utilized to identify one or more risk statements that may be substantially similar to one another. In some embodiments, contextual mapping engine 125 may be utilized to identify one or more controls that may be substantially similar to one another. In some embodiments, contextual mapping engine 125 may be utilized to identify one or more risk statements that may be substantially similar to one or more controls.

Simple word matching may be inadequate to identify the one or more risk statements and/or controls that are substantially similar to others, because even an individual may write an expression differently from day to day. There may be more problems associated with statement drafting when the process involves several different authors working on hundreds or even thousands of different risk statements and/or controls. Thus, contextual mapping engine 125 may be utilized to identify commonalities in the context of the statements and/or controls. In so doing, one may "score" each comparison so that a list of statements and/or controls with the highest scores may be generated. The list of statements and/or controls may then be examined to determine whether (a) the two statements and/or controls are justifiably different, or (b) the two statements and/or controls are directed to the same subject matter. If two statements (or controls) are determined to be directed to the same subject matter, one of the statements may be removed from the list, or redrafted and used instead. By identifying statements (or controls) that are similar to one another, a list of unique statements may be generated. The generation of the list of unique statements helps to reduce the total number of statements and thus helps to improve the efficiency of a designer of business process controls, and/or a risk analyst. In addition, the identification of statements (or controls) that are similar to one another may help to standardize the language used in the statements.

The following is an example of how contextual mapping engine 125 may be utilized in identification of one or more redundant risk statements, such that these risk statements may be removed, redrafted, or standardized.

EXAMPLE 1

A list of risk statements may be presented. Contextual mapping engine 125 may be utilized and statements in the list may be compared against one another. The comparison may result in a score depending on how similar the two statements are. The scores associated with the comparison may be included in a result list along with the statements. It is contemplated that the result list may be included as part of the original list of risk statements, or the result list may be a separate list.

In some embodiments, a user may establish a threshold such that statements with scores that fall below the threshold may be removed from the result list. After all statements have been compared, the result list may be sorted and the statements may be arranged according to their respective scores. The user may view the result list to determine whether contextual mapping engine 125 has identified proper matches between two statements. If the user determines that the match is valid, the user may flag the two statements for resolution, such as removing or redrafting one of the statements. This process of comparing, scoring, sorting, and viewing may be repeated as many times as the user deems necessary. This process may help to ensure removal of redundancies in the list of risk statements. It is contemplated that the same process may be used for a list of control requirements, etc.

The following is an example of how contextual mapping engine 125 may be utilized in performing source requirement mapping, so as to ensure that requirements are being met.

EXAMPLE 2

Two lists may be presented—one may be a list of control requirements (e.g., the source list), and the other may be a list of policy statements (e.g., the target list). Contextual mapping engine 125 may be utilized to compare each item in the source list against each item in the target list. Each comparison may result in a score depending on how similar the two items are. The scores associated with each comparison may be included in a result list along with the source and the target statements.

In some embodiments, a user may establish a threshold such that statements with scores that fall below the threshold may be removed from the result list. After all statements in both the source list and the target list have been compared, the result list may be sorted and the statements may be arranged according to their respective scores. The user may view the result list to determine whether contextual mapping engine 125 has identified proper matches between two statements. If the user determines that the match is valid, the user may flag the two statements to establish a relationship or a link between the two statements from the two lists. It is contemplated that the same process may be used for other types of source and target statements.

According to some embodiments, contextual mapping engine 125 may employ an algorithm in determining match scores associated with different statements. In some embodiments, the algorithm may operate according to the following criteria:

Ignore all whitespace, numbers, punctuation and non-alphabetic characters;
Parse the remaining text into word fragments, delineated by a single space;
Ignore words shorter than four (4) characters;
Truncate words greater than six (6) characters;
Let X equal the count (e.g., number) of unique tokens for both blocks of text;
Let Y equal the count (e.g., number) of matching tokens;
Let Score equal the ratio Y/X as a percentage.

It is contemplated that the algorithm may include additional criteria, if desired. It is also contemplated that one of more of the above-identified criteria may be modified. For example, words that are shorter than three (3) characters may be ignored, rather than four (4).

The following is an example of how contextual mapping engine 125 may operate.

EXAMPLE 3

For example, consider the two risk statements below:
1: Unmonitored changes, additions, or deletions of master data elements may result in financial reporting errors.
2: The possibility of unauthorized or inadvertent alterations of master data may negatively impact financial report requirements.

In this example, both statements are written differently but they appear to relate to the same subject matter. The following illustrates the matching tokens between the two sample statements in bold text:
1: UNAUTHORIZED CHANGES, ADDITIONS, OR DELETIONS OF MASTER DATA ELEMENTS MAY RESULT IN FINANCIAL REPORT ERRORS.
2: THE POSSIBILITY OF UNAUTHORIZED OR INADVERTENT ALTERATIONS OF MASTER DATA MAY NEGATIVELY IMPACT FINANCIAL REPORTING REQUIREMENTS.

In this example, X may be assigned the count of 17, indicating the total number of unique words between the two statements. The Y may be assigned the count of 10, indicating the total number of matching words between the two statements. Y may then be divided by X, to obtain a matching score of 58.8% (i.e., 10/17). Also as shown in this example, the matching score may be based on matching identical tokens between the two statements. However, according to some embodiments, the matching score may be based on words that are similar to one another, such as synonyms.

EXAMPLE 4

For example, consider the same two risk statements from Example 1.

The following illustrates the matching tokens between the two sample statements in bold text, including words that may be similar to one another:
1: UNAUTHORIZED CHANGES, ADDITIONS, OR DELETIONS OF MASTER DATA ELEMENTS MAY RESULT IN FINANCIAL REPORT ERRORS.
2: THE POSSIBILITY OF UNAUTHORIZED OR INADVERTENT ALTERATIONS OF MASTER DATA MAY NEGATIVELY IMPACT FINANCIAL REPORTING REQUIREMENTS.

In this example, X may be assigned the count of 17, indicating the total number of unique tokens between the two statements. The Y may be assigned the count of 12, indicating the total number of matching tokens between the two statements. Y may then be divided by X to obtain score of 70.6% (i.e., 12/17).

According to some embodiments, analysis tool 120 may be used in generating a list and/or a report containing statements whose scores are higher than a predetermined percentage, such as, for example, 80%. According to some embodiments, analysis tool 120 may be used in generating a list and/or a report containing unique statements arranged in a predetermined order based on their associated scores. The different lists and/or reports generated may be useful in identifying those statements that are substantially identical, and therefore, may be removed or redrafted. The identification of unique statements (i.e., statements that are different from one another) may improve the efficiency in conducting risk analysis/management, for at least the reason that less statements may need to be analyzed.

While the foregoing may be described in connection with analysis tool 120, it is contemplated that contextual mapping engine 125 may be utilized in other phases of designing and/or implementing business process controls where textual mapping between any block of text is desired. Contextual mapping engine 125 and associated tools may be designed to (1) help identify and eliminate redundancy such as eliminating redundant controls within a business process, (2) map similar blocks of text such as mapping a control requirement to a client's corporate policy directives, (3) help to categorize or classify requirements into similar buckets, etc.

Figure 2:
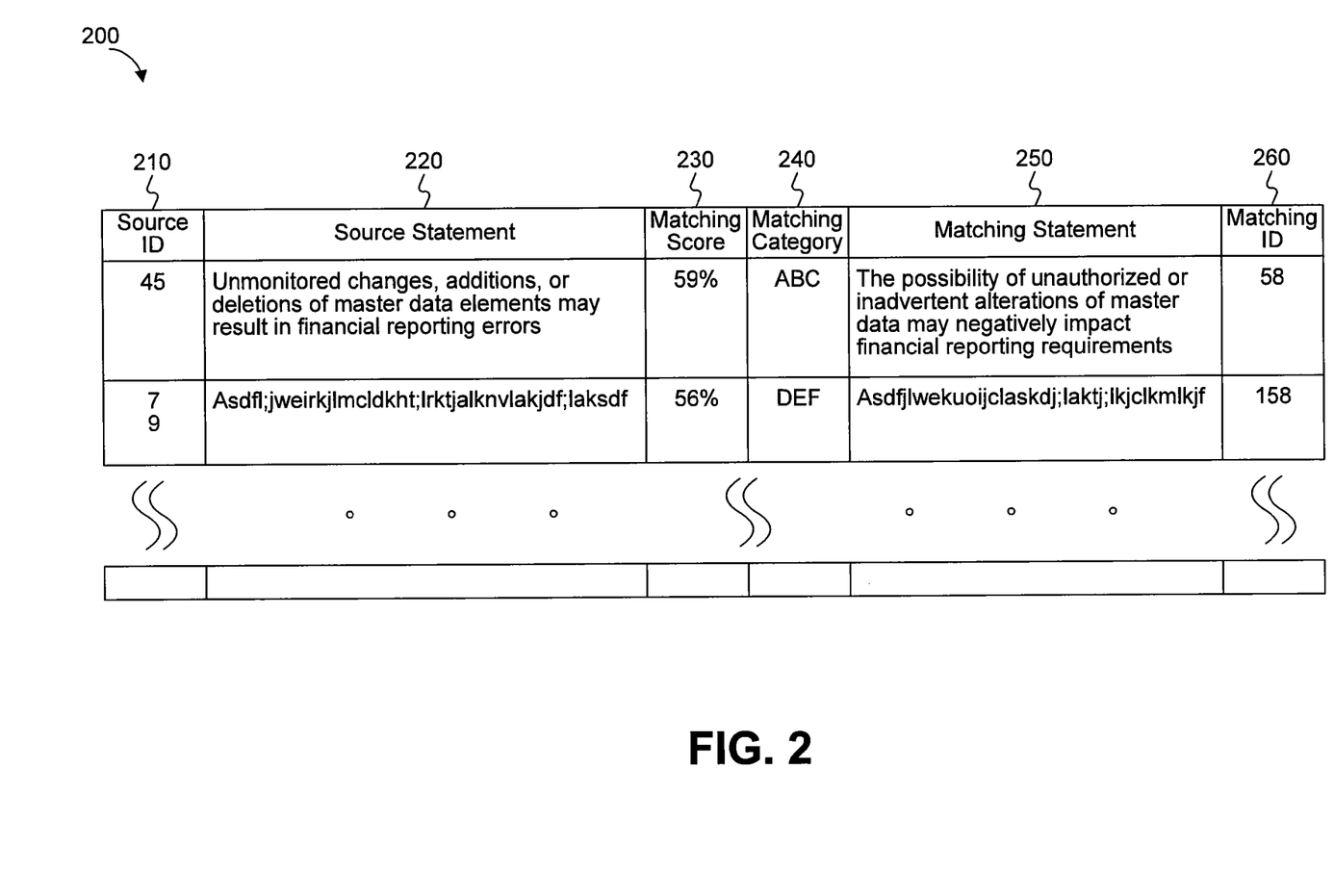
FIG. 2 illustrates an exemplary embodiment of a report that may be generated by the system of FIG. 1.

FIG. 2 illustrates a report 200 that may be generated by analysis tool 120. In the embodiment as shown, report 200 includes a source ID column 210, a source statement column 220, a matching score column 230, a matching category 240, a matching statement column 250, and a matching ID 260. Source ID column 210 may include IDs (e.g., identifications) associated with source statements such as risk statements and/or controls. In the embodiment as shown, there may be one or more source statements that are identical, such that there are one or more source IDs (e.g., identifications) indicated in source ID column 210. In some embodiments, source statement column 220 may include the source statements to which other statements are compared to.

In the embodiment as shown, matching score column 230 may include matching scores generated by comparing the source statements and other statements. Matching category column 240 may include one or more categories to which the source statements and/or matching statements belong. Matching statement column 250 may include the statements that are compared to the source statements and from which the matching scores are obtained. Matching ID column 260 may include IDs (e.g., identifications) associated with the matching statements such as risk statements and/or controls. It is contemplated that more or fewer columns may be included in report 200, if desired. For example, report 200 may include an additional column (not shown) directed to an importance rating (e.g., high, medium, or low importance) associated with a particular statement and/or control.

In some embodiments, analysis tool 120 may help to generate other types of reports such as a report listing various statements associated with matching scores that are above or below a predetermined threshold. In some embodiments, reports generated by analysis tool 120 may be updated dynamically. For example, reports generated by analysis tool 120 may be updated based on information communicated by planning tool 110, such that updates received by planning tool 110 assist in updating the reports generated by analysis tool 120. According to some embodiments, analysis tool 120 may be connected to repositories 115 and the reports generated by analysis tool 120 may be stored in repositories 115.

Figure 3:
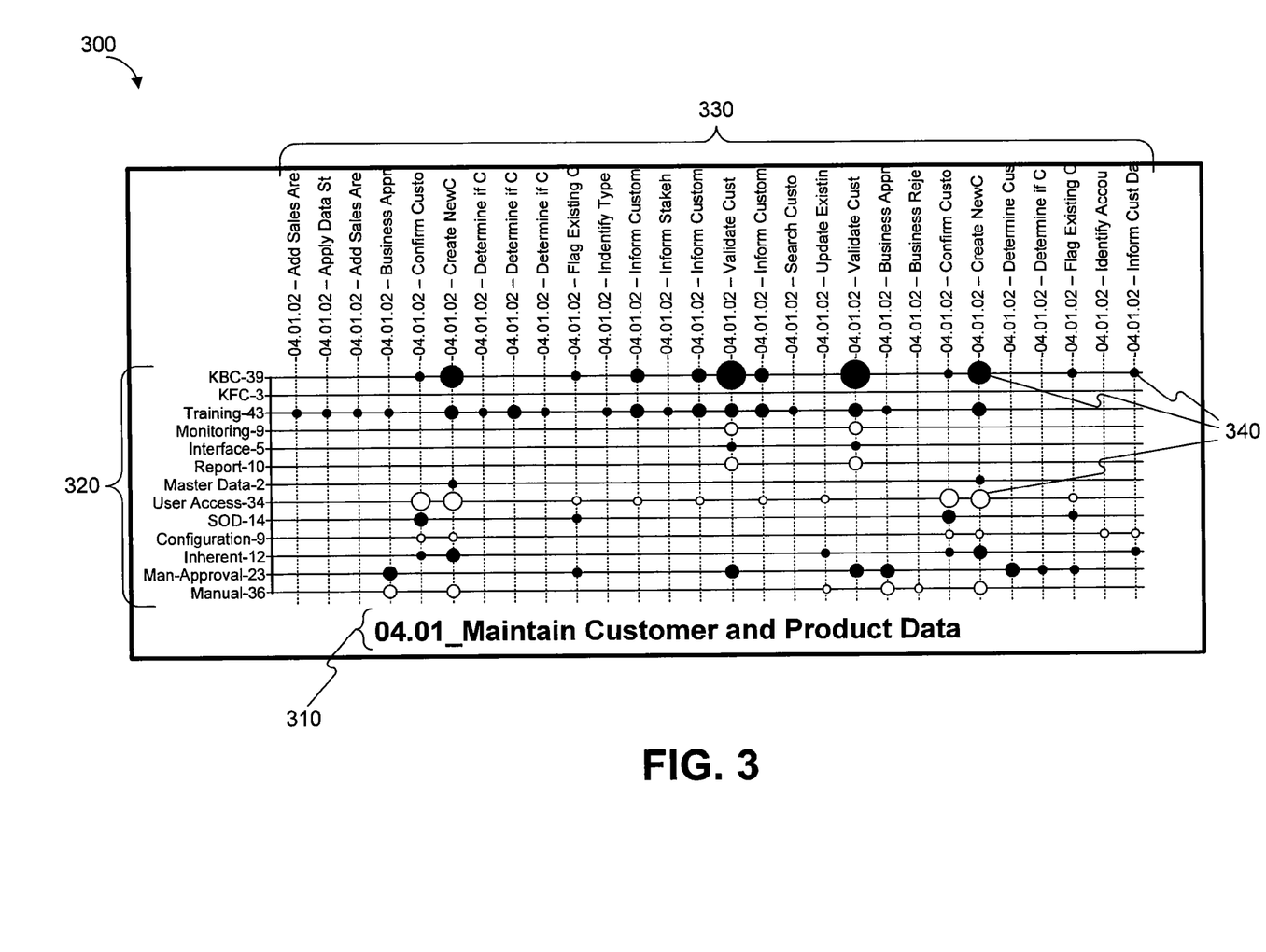
FIG. 3 illustrates an exemplary embodiment of a bubble chart that may be used with the system of FIG. 1.

According to some embodiments, design tool 130 may assist a user in the design phase of designing and/or implementing business process controls. FIG. 3 illustrates an exemplary bubble chart 300 that may be generated by design tool 130. According to some embodiments, design tool 130 may be connected to repositories 115 (referring to FIG. 1) and bubble chart 300 generated by design tool 130 may be stored in repositories 115. In the embodiment shown in FIG. 3, bubble chart 300 may include a label 310, a first section 320, a second section 330, and bubbles 340. Label 310 may indicate a general type of risk statements and/or controls that a user using system 100 wishes to review and/or analyze. First section 320 may include various types of control and second section 330 may include various types of risk, for example.

In some embodiments, bubbles 340 may be sized according to the number of controls that are present for each type of risk. In other words, a bubble 340 representing 10 controls associated with a particular risk is larger than a bubble 340 representing 3 controls associated with a particular risk. Similarly, a bubble 340 representing 10 controls associated with a particular risk is smaller than a bubble 340 representing 30 controls associated with a particular risk. In some embodiments, the number of controls associated with a particular risk may be determined based on matching scores between the controls and the particular risk. For example, a user may select a particular risk statement as a source statement, and analysis tool 120 may generate matching scores between various controls and the selected risk. Analysis tool 120 may then be utilized to determine which controls may be associated with the selected risk based on their matching scores. In some embodiments, a user may click on a bubble 340 and may access information relating to the selected bubble 340, such as a list of controls and/or risks associated with the selected bubble 340, for example. Bubble chart 300 may assist a user using system 100 to more efficiently identify areas that are over-controlled and areas that are under-controlled.

Figure 4:
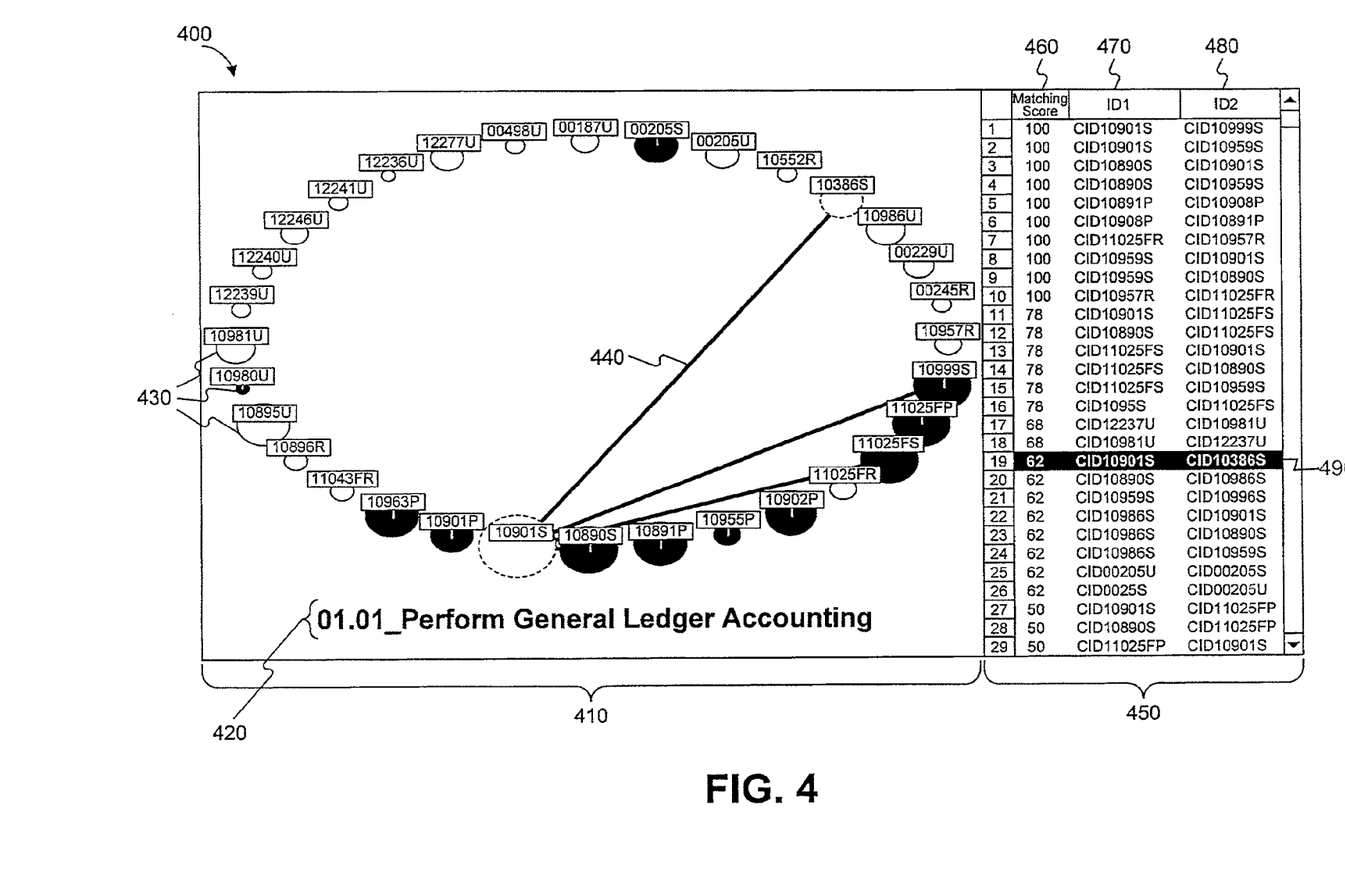
FIG. 4 illustrates an exemplary embodiment of a spider chart that may be used with the system of FIG. 1.

FIG. 4 illustrates an exemplary spider chart 400 that may be generated by design tool 130. According to some embodiments, spider chart 400 may be stored in repositories 115. In the embodiment as shown, spider chart 400 may include a first section 410 and a second section 450. In some embodiments, first section 410 may include a label 420, bubbles 430, and connectors 440. Label 420 may indicate a general type of risk statements and/or controls that a user of system 100 wishes to review and/or analyze. In the embodiment as shown, bubbles 430 may represent the number of controls present for each type of risk, and the number of controls associated with a particular risk. Connectors 440 may connect one or more bubbles 430 with one another based on their matching scores. It is contemplated that a user may determine the threshold matching scores for which connectors 440 are utilized.

Still referring to FIG. 4, second section 450 may include a matching score column 460, a first ID column 470, and a second ID column 480. Matching score column 460 may include matching scores between the statements included in first ID column 470 and the statements included in second ID column 480. In the embodiment as shown, a user may select a particular set of statements 490 from second section 450, and bubble 430 associated with the user selected statement 490 listed in first ID column 470 may be highlighted on spider chart 400. Spider chart 400 may assist a user using system 100 to more efficiently identify areas that are over-controlled and may also assist the user in identifying any redundancy in either the controls or the risks included in the over-controlled areas.

According to some embodiments, building tool 140 may assist a user in the building phase of designing and/or implementing business process controls, testing tool 150 may assist a user in the testing phase of designing and/or implementing business process controls, and operation tool 160 may assist a user in the operation phase of designing and/or implementing business process controls. Referring back to FIG. 1, building tool 140, testing tool 150, and operation tool 160 may be connected to repositories 115. In some embodiments, building tool 140, testing tool 150, and/or operation 160 may generate one or more progress reports identifying the progress of a specific phase of design and/or implementation of business process controls. In some embodiments, testing tool 150 may generate reports regarding a success or a failure associated with a set of business process controls that may have been designed by a user of system 100. Repositories 115 may store various reports generated by building tool 140, testing tool 150, and/or operation 160.

Figure 5:
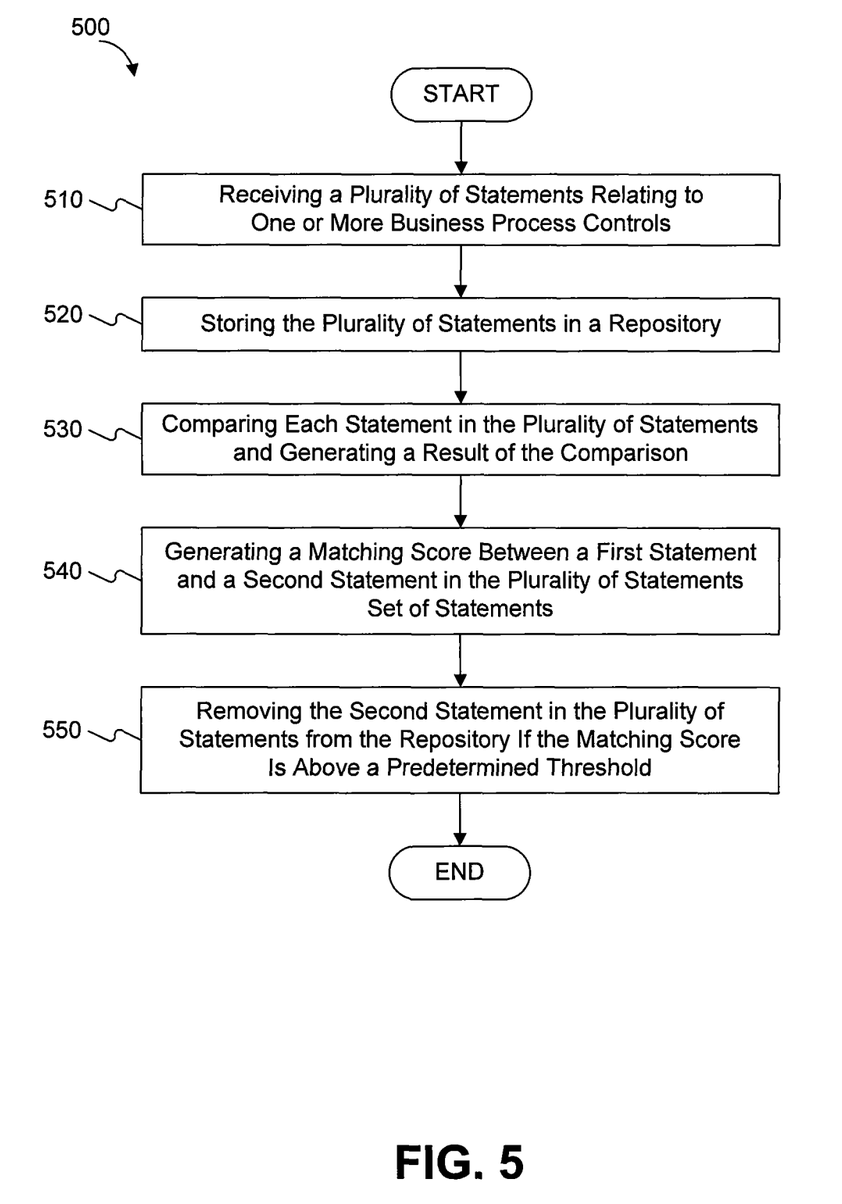
FIG. 5 illustrates an exemplary process of performing business process control design utilizing a contextual mapping engine.

FIG. 5 illustrates an exemplary process 500 for designing business process controls utilizing a contextual mapping engine. In the embodiment as shown, at stage 510, process 500 receives a plurality of statements relating to one or more business process controls. In some embodiments, the plurality of statements may be related to designing and/or implementing business process controls, such as goals, rules, guidelines, or requirements, and/or any other type of appropriate parameters. At stage 520, process 500 may store the plurality of statements in repository 115. At stage 530, process 500 may compare each statement in the plurality of statements with one another and generate a result of the comparison. In some embodiments, the comparison may be performed utilizing analysis tool 120 and contextual mapping engine 125. For example, analysis tool 120 and contextual mapping engine 125 may be used to generate a matching score among each statement in the plurality of statements at stage 540. The determination of the matching score may be obtained based on an algorithm as described above. It is contemplated that for specific applications, other suitable algorithms may be used.

At stage 550, process 500 may remove statements in the plurality of statements from repository 115 if the matching scores associated with the statements are above a predetermined threshold. For example, a user of system 100 may set a threshold of 60%, such that any matching score between statements in the plurality of statements that is above 60% will result in the statements being removed from repository 115. It is contemplated that these statement may be redrafted and the redrafted statement may be stored in repository 115 in place of the removed statement.

Figure 6:
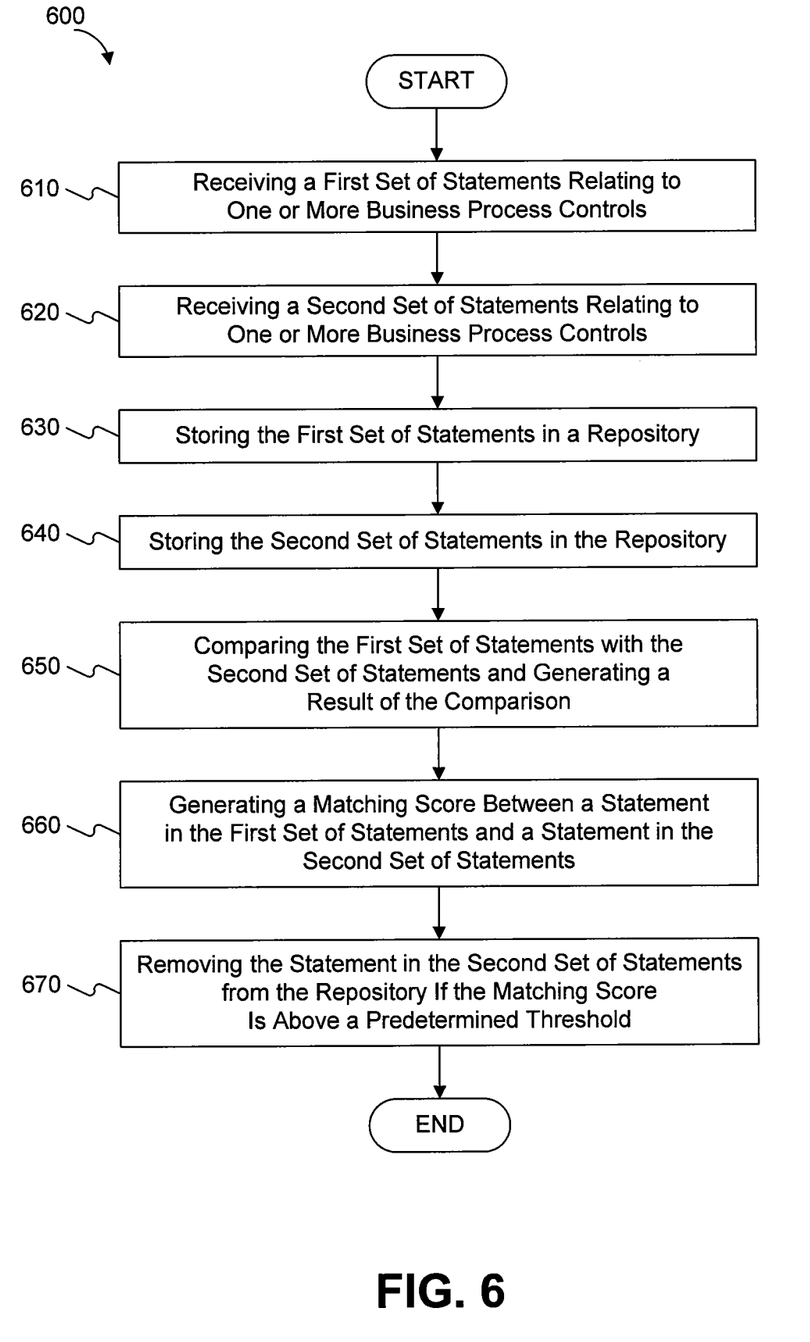
FIG. 6 illustrates another exemplary process of performing business process control design utilizing a contextual mapping engine.

FIG. 6 illustrates an exemplary process 600 for designing business process controls utilizing a contextual mapping engine. In the embodiment as shown, at stage 610, process 600 may receive a first set of statements relating to one or more business process controls. In some embodiments, the first set of statements may be a set of parameters related to designing and/or implementing business process controls. In some embodiments, the parameters may include goals, rules, guidelines, requirements, policies, procedures, risk statements, controls (e.g., elements of management such as setting standards, measuring actual performance, and/or taking corrective action), and/or any other type of appropriate parameters. At stage 620, process may receive a second set of statements relating to the one or more business process controls. According to some embodiments, the second set of statements may be of the same types of parameter as the first set of statements. For example, both set may include risk statements. According to some embodiments, the second set of statements may be of a different type of parameters from the first set of statements. For example, the first set of statements may include risk statements and the second set of statements may include controls.

Also as illustrated, at stage 630, process 600 may store the first set of statements in repository 115. Process 600 may store the second set of statements in repository 115 at stage 640. At stage 650, process 600 may compare the first set of statements with the second set of statements and generate a result of the comparison. In some embodiments, the comparison may be performed utilizing analysis tool 120 and contextual mapping engine 125. For example, analysis tool 120 and contextual mapping engine 125 may be used to generate a matching score between a statement in the first set of statements and a statement in the second set of statements based on the result of the comparison at stage 660. The determination of the matching score may be obtained based on an algorithm as described above.

At stage 670, process 600 may remove the statement in the second set of statements from repository 115 if the matching score is above a predetermined threshold. For example, a user of system 100 may set a threshold of 70%, such that any matching score between the statement in the first set and the statement in the second set that is above 70%, will result in the statement in the second set being removed from repository 115. It is contemplated that the statement in the second set may also be redrafted and the redrafted statement stored in repository 115.

Figure 7:
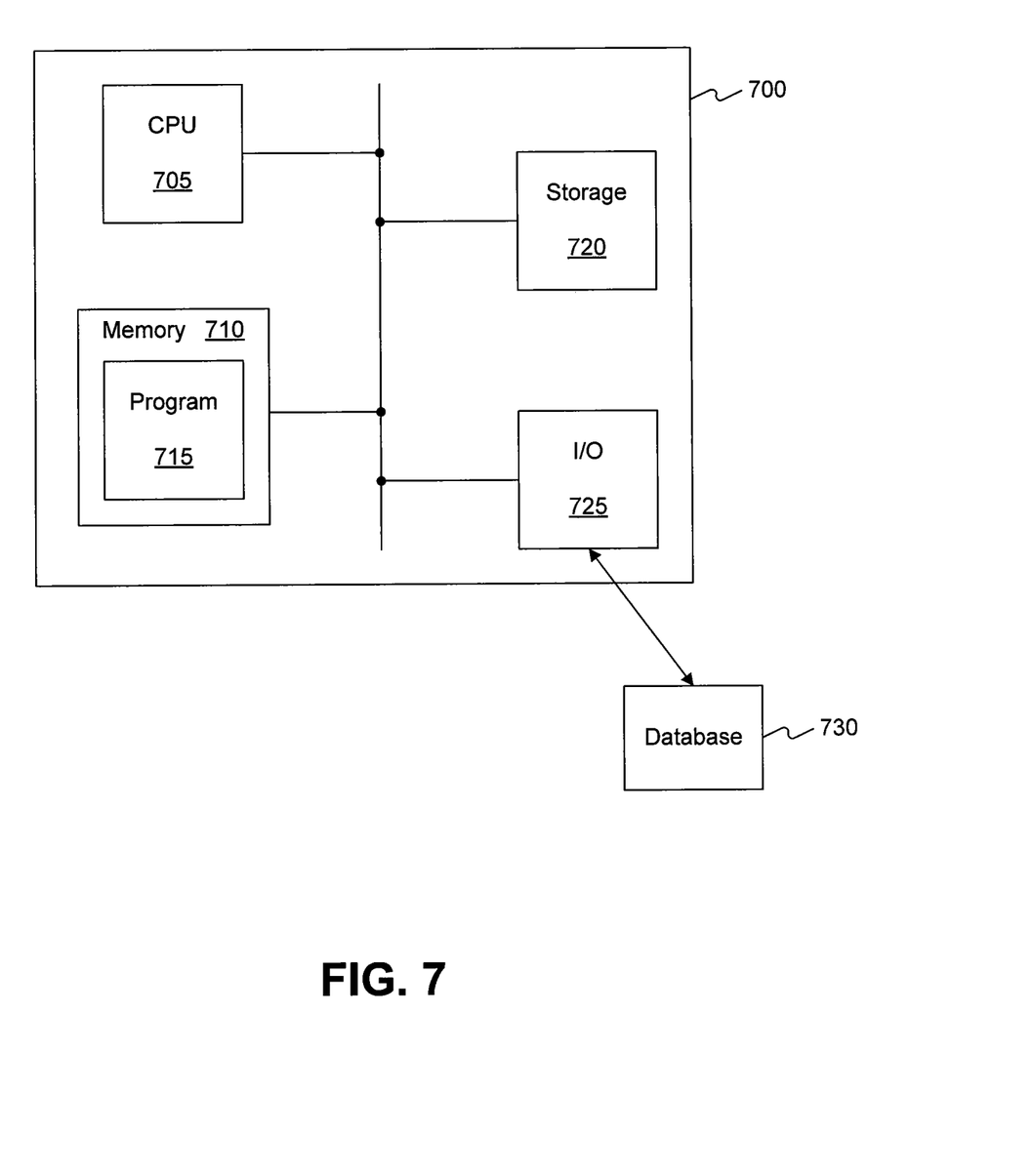
FIG. 7 illustrates an exemplary computing system suitable for implementing embodiments consistent with the invention.

FIG. 7 illustrates an exemplary computing system 700 that may be used to implement embodiments of the invention. The components and arrangement, however, may be varied within principles of the present application.

Data processing or computing system 700 includes a number of components, such as a central processing unit (CPU) 705, a memory 710, an input/output (I/O) device(s) 725, a nonvolatile storage device 720, and a database 730. System 700 can be implemented in various ways. For example, an integrated platform (such as a workstation, personal computer, laptop, etc.) may comprise CPU 705, memory 710, nonvolatile storage 720, and I/O devices 725. In such a configuration, components 705, 710, 720, and 725 may connect through a local bus interface and access database 730 (shown implemented as a separate database system) via an external connection. This connection may be implemented through a direct communication link, a local area network (LAN), a wide area network (WAN) and/or other suitable connections. In some embodiments, database 730 may be an embedded database, such that components 705, 710, 720, and 725 may access database 730 through a retrieval library (not shown).

CPU 705 may be one or more known processing devices, such as a microprocessor from the Pentium™ family manufactured by Intel™ or the Turion™ family manufactured by AMD™. Memory 710 may be one or more storage devices configured to store information used by CPU 705 to perform certain functions related to embodiments of the present application. Storage 720 may be a volatile or non-volatile, magnetic, semiconductor, tape, optical, removable, non-removable, or other type of storage device or computer-readable medium. In one embodiment consistent with the invention, memory 710 includes one or more programs or subprograms 715 loaded from storage 720 or elsewhere that, when executed by CPU 705, perform various procedures, operations, or processes consistent with the present application. For example, memory 710 may include various exemplary components included in system 100, such as planning tool 110, analysis tool 120, design tool 130, building tool 140, testing tool 150, and/or operation tool 160. These components may also be embodied in a computer-readable storage memory containing instructions that, when executed by a processor, such as CPU 705, perform methods as described above.

Methods, systems, and articles of manufacture consistent with the present application are not limited to separate programs or computers configured to perform dedicated tasks. For example, memory 710 may be configured with a program 715 that performs several functions when executed by CPU 705. For example, memory 710 may include a single program 715 that performs the functions of planning tool 110, analysis tool 120, design tool 130, building tool 140, testing tool 150, and/or operation tool 160. Moreover, CPU 705 may execute one or more programs located remotely from system 700. For example, system 700 may access one or more remote programs that, when executed, perform functions related to embodiments of the present application.

Memory 710 may be also be configured with an operating system (not shown) that performs several functions well-known in the art when executed by CPU 705. By way of example, the operating system may be Microsoft Windows™, Unix™, Linux™, an Apple Computers operating system, Personal Digital Assistant operating system such as Microsoft CE™, or other operating system. The choice of operating system, and even to the use of an operating system, is not critical to the invention.

I/O device(s) 725 may comprise one or more input/output devices that allow data to be received and/or transmitted by system 700. For example, I/O device 725 may include one or more input devices, such as a keyboard, touch screen, mouse, and the like, that enable data to be input from a member, such as concept information, status labels, database identifiers, etc. Further, I/O device 725 may include one or more output devices, such as a display screen, CRT monitor, LCD monitor, plasma display, printer, speaker devices, and the like, that enable data to be output or presented to a member. I/O device 725 may also include one or more digital and/or analog communication input/output devices that allow computing system 700 to communicate with other machines and devices. System 700 may input data from external machines and devices and output data to external machines and devices via I/O device 725. In one embodiment, I/O device 725 may include an interface (not shown) to receive inputs from user of system 100. The configuration and number of input and/or output devices incorporated in I/O device 725 are not critical to the invention.

System 700 may also be communicatively connected to a database 730. Database 730 may comprise one or more databases that store information and are accessed and/or managed through system 700. By way of example, database 730 may be an Oracle™ database, a Sybase™ database, a DB2 database, or other relational database. Database 730 may include, for example, one or more repositories 115 that store inputs received by planning tool 110 and/or various reports and charts generated by analysis tool 120, design tool 130, building tool 140, testing tool 150, and operation tool 160. Systems and methods of the present application, however, are not limited to separate databases or even to the use of a database.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of designing business process controls utilizing a contextual mapping engine, the computer-implemented method comprising:
   receiving, in a computer system, a plurality of statements relating to one or more business process controls,
      each statement, in the plurality of statements, comprising at least one token;
   storing the plurality of statements in a repository of the computer system;
   comparing, using the contextual mapping engine in the computer system, a first statement of the plurality of statements with a second statement of the plurality of statements;
   generating, using the contextual mapping engine in the computer system, a matching score between the first statement and the second statement,
      the matching score being based on a total amount of unique tokens between the first statement and the second statement;
   removing the second statement of the plurality of statements from the repository if the matching score is above a particular threshold;
   generating a chart including a plurality of bubbles,
   generating the chart including:
      connecting a first bubble, of the plurality of bubbles, to a second bubble, of the plurality of bubbles, when the matching score is above the particular threshold,
      where a size of each bubble, of the plurality of bubbles, is based on a number of parameters relating to a particular business process control of the one or more business process controls;
   providing the chart, including the first bubble connected to the second bubble, for display to a user device;
   receiving, from the user device, a selection of a bubble of the plurality of bubbles; and
   providing, for display, information relating to the selected bubble,
      the information including parameters relating to a business process control of the one or more business process controls.

2. The method of claim 1, further comprising:
   receiving a plurality of parameters relating to the one or more business process controls;
   storing the plurality of parameters in the repository;
   comparing, using the contextual mapping engine, the plurality of parameters with the plurality of statements;
   generating, using the contextual mapping engine, a particular matching score between a first parameter of the plurality of parameters and the first statement of the plurality of statements; and
   associating the first parameter with the first statement in the repository if the particular matching score is above a threshold.

3. The method of claim 2,
   where a size of the first bubble, representing a first number of parameters associated with the first statement in the repository, is larger than a size of the second bubble representing a second number of parameters associated with the second statement in the repository, and
   where the first number of parameters is greater than the second number of parameters.

4. The method of claim 1, where the particular threshold is specified by a user of the user device.

5. The method of claim 1, further comprising:
   receiving updates of at least one of the plurality of statements;
   updating a matching score associated with the at least one of the plurality of statements to produce an updated matching score; and
   generating a list of the plurality of statements arranged according to the updated matching score.

6. A system comprising:
   a processor; and
   a memory coupled to the processor and storing instructions which, when executed by the processor, cause the processor to:
      receive a first set of statements relating to one or more business process controls,
         each statement in the first set of statements comprising at least one token;
      store the first set of statements in a repository;
      compare a first statement of the first set of statements with a second statement of the first set of statements;
      generate a result of comparing the first statement with the second statement;
      generate, based on the result, a matching score between the first statement and the second statement, the matching score being based on a total amount of unique tokens between the first statement and the second statement;
remove the second statement of the first set of statements from the repository if the matching score is above a particular threshold;
generate a chart including a plurality of bubbles,
  where a size of each bubble, of the plurality of bubbles, is based on a number of parameters relating to a particular business process control of the one or more business process controls,
  when generating the chart, the processor is to connect a first bubble, of the plurality of bubbles, to a second bubble, of the plurality of bubbles, when the matching score is above the particular threshold;
provide, for display to a user device, the chart including the first bubble connected to the second bubble,
  the chart identifying redundancy relating to the first set of statements;
receive, from the user device, a selection of a bubble of the plurality of bubbles of the chart provided for display; and
provide, for display to the user device, information relating to the selected bubble,
  the information including parameters relating to a business process control of the one or more business process controls.

7. The system of claim 6, where the memory further includes instructions which, when executed by the processor, cause the processor to:
receive a second set of statements relating to the one or more business process controls;
store the second set of statements in the repository;
compare the first set of statements with the second set of statements;
generate a comparison result of comparing the first set of statements with the second set of statements;
generate another matching score between a statement in the first set of statements and a statement in the second set of statements based on the comparison result; and
associate the statement in the first set of statements with the statement in the second set of statements in the repository if the other matching score is above a threshold.

8. The system of claim 7, where the size of each bubble is further based on a number of statements in the second set of statements associated with a statement in the first set of statements;
where a size of a third bubble, of the plurality of bubbles, representing a first number of statements in the second set of statements associated with a first statement in the first set of statements is larger than a size of a fourth bubble, of the plurality of bubbles, representing a second number of statements in the second set of statements associated with a second statement in the first set of statements; and
where the first number is greater than the second number.

9. The system of claim 8, where the particular threshold is specified by a user of the user device.

10. A computer-implemented method comprising:
receiving, by a computer, a first set of statements relating to one or more business process controls,
  each statement in the first set of statements comprising at least one token;
receiving, by the computer, a second set of statements relating to the one or more business process controls,
  each statement in the second set of statements comprising at least one token;
storing, by the computer, the first set of statements in a repository of a memory;
storing, by the computer, the second set of statements in the repository;
comparing, by the computer, the first set of statements with the second set of statements;
generating, by the computer, a result of comparing the first set of statements with the second set of statements;
generating, by the computer and based on the result, a matching score between a statement in the first set of statements and a statement in the second set of statements,
  the matching score being based on a total amount of unique tokens between the statement in the first set of statements and the statement in the second set of statements;
removing, by the computer, the statement in the second set of statements from the repository if the matching score is above a particular threshold;
generating, by the computer, a chart including a plurality of bubbles,
  where a size of each bubble, of the plurality of bubbles, is based on a number of parameters relating to a particular business process control of the one or more business process controls,
  generating the chart including connecting a first bubble, of the plurality of bubbles, to a second bubble of the plurality of bubbles when the matching score is above the particular threshold;
providing, by the computer and for display to a user device, the chart including the first bubble connected to the second bubble,
  the chart identifying redundancy relating to the first set of statements;
receiving, by the computer and via the user device, a selection of a bubble of the plurality of bubbles provided for display; and
providing, by the computer and for display, information relating to the selected bubble,
  the information including parameters associated with the selected bubble.

11. The method of claim 10, further comprising:
receiving a third set of statements relating to the one or more business process controls;
storing the third set of statements in the repository;
comparing the first set of statements with the third set of statements;
generating a result of comparing the first set of statements with the third set of statements;
generating a matching score between a statement in the first set of statements and a statement in the third set of statements based on the result of comparing the first set of statements with the third set of statements; and
associating the statement in the first set of statements with the statement in the third set of statements in the repository if the matching score, between the statement in the first set of statements and the statement in the third set of statements, is above a threshold.

12. The method of claim 11, where a size of a bubble, in the chart, is based on a number of statements in the third set of statements associated with a statement in the first set of statements;
where a size of the first bubble, representing a first number of statements in the third set of statements associated with a first statement in the first set of statements, is larger than a size of the second bubble representing a second number of statements in the third set of statements associated with a second statement in the first set of statements, and where the first number is greater than the second number.

13. The method of claim 10, where the particular threshold is specified by a user of the user device.

14. A non-transitory computer-readable storage medium storing instructions, the instructions comprising:
one or more instructions which, when executed by a processor, cause the processor to:
receive a plurality of statements relating to one or more business process controls,
each statement in the plurality of statements comprising at least one token;
store the plurality of statements in a repository;
compare a first statement of the plurality of statements with a second statement of the plurality of statements;
generate a result of comparing the first statement with the second statement;
generate a matching score between the first statement and the second statement based on the result;
the matching score being based on a total amount of unique tokens between the first statement and the second statement;
remove the second statement of the plurality of statements from the repository if the matching score is above a particular threshold;
generate a chart including a plurality of bubbles,
where a size of each bubble, of the plurality of bubbles, is based on a number of parameters relating to a particular business process control of the one or more business process controls;
provide the chart for display to a user device,
a first bubble, of the plurality of bubbles, being connected to a second bubble, of the plurality of bubbles, when the matching score is above the particular threshold;
receive, from the user device, a selection of a bubble of the plurality of bubbles provided for display; and
provide, to the user device for display, information relating to the selected bubble,
the information including parameters associated with the selected bubble.

15. The method of claim 1, where each token comprises a block of text or a word.

16. The method of claim 1, where the total amount of unique tokens comprises a sum of a total number of non-identical tokens in the first statement and the second statement.

17. The method of claim 1, further comprising:
determining, utilizing the contextual mapping engine in the computer system, a number of matching tokens between the first statement and the second statement, where:
the first statement comprises one or more first statement words;
the second statement comprises one or more second statement words;
each word, in the one or more first statement words and the one or more second statement words, comprises a token;
the matching tokens include words that are synonyms; and
the matching score is generated further based on the number of matching tokens between the first statement and the second statement.

18. The method of claim 17, where determining the number of matching tokens comprises:
obtaining text based on ignoring whitespace, numbers, punctuation and non-alphabetic characters included in the plurality of statements;
parsing the text into a plurality of tokens;
ignoring tokens, of the plurality of tokens, shorter than a first particular number of characters; and
truncating tokens, of the plurality of tokens, greater than a second particular number of characters.

19. The method of claim 17, where the matching score is generated based on a ratio between the total amount of unique tokens and the number of matching tokens.

20. The method of claim 1, further comprising:
replacing the first statement of the plurality of statements with a redrafted statement if the matching score is above the particular threshold.

21. The method of claim 20, further comprising:
generating, using the contextual mapping engine, a matching score between the redrafted statement and a third statement of the plurality of statements; and
removing the third statement of the plurality of statements from the repository if the matching score, between the redrafted statement and the third statement, is above the particular threshold.

22. The method of claim 1, further comprising:
receiving, via the user device, a determination that the matching score is valid; and
linking the first statement and the second statement based on the determination.

23. The method of claim 1, where the chart comprises a spider chart including a first section and a second section,
the method further comprising:
detecting selection of a particular statement of the plurality of statements; and
causing a particular bubble, of the plurality of bubbles, to be highlighted.

* * * * *